US006861974B1

United States Patent
Poe et al.

(10) Patent No.: US 6,861,974 B1
(45) Date of Patent: Mar. 1, 2005

(54) CLUTTER NORMALIZATION BY ADAPTATION OF TRANSMIT WAVEFORM

(75) Inventors: Randall Charles Poe, Morton, PA (US); Carl Edward Hein, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/687,379

(22) Filed: Oct. 16, 2003

(51) Int. Cl.$^7$ ............................................. G01S 13/12
(52) U.S. Cl. ..................... 342/127; 342/128; 342/129; 342/130; 342/134; 342/135; 342/137
(58) Field of Search ........................ 342/118, 126–131, 342/134, 135, 137, 174, 192, 196

(56) References Cited

U.S. PATENT DOCUMENTS

| | | | | |
|---|---|---|---|---|
| 5,629,706 A | * | 5/1997 | B.ang..ang.th | 342/124 |
| 2002/0063622 A1 | * | 5/2002 | Armstrong et al. | 340/10.31 |
| 2002/0140597 A1 | * | 10/2002 | Taylor et al. | 342/28 |
| 2002/0175805 A9 | * | 11/2002 | Armstrong et al. | 340/10.31 |
| 2004/0056794 A1 | * | 3/2004 | Erkocevic-Pribic | 342/196 |

OTHER PUBLICATIONS

"Analysis of terrain scattered interference–mitigation", Nelander, A.;Radar Conference, 2004. Proceedings of the IEEE, Apr. 26–29, 2004 pp. 414–419.*

"Measurement of S band clutter statistics using quasi–deconvolution filter for a phase coded waveform", LeFurjah, G.; Foreman T.; Boyer, Dd.B.;Radar Conference, 2003. Proceedings of the 2003 IEEE, May 5–8, 2003 pp.34–37.*

"Potentials of ultra–short–pulse time–domain scattering measurements", Van Cappellen, W.A.; de Jongh, R.V.; Ligthart, L.P.;Antennas and Propagation Magazine, IEEE, vol. 42, Issue: 4, Aug. 2000 pp.35–45.*

* cited by examiner

Primary Examiner—John B. Sotomayor
(74) Attorney, Agent, or Firm—Duane Morris LLP

(57) ABSTRACT

A radar, sonar, lidar or like active detection, tracking system calculates the clutter which would occur with various different transmit waveforms, and selects from among those waveforms that one which, given the current clutter, is expected to minimize variation or variability of the clutter. The calculation is performed by generating a clutter kernel for the current transmitted or other reference waveform, and calculating the clutter which would result with alternate transmit waveform(s). The variability of the various clutter responses is determined, and the transmit waveform exhibiting the least clutter variability is selected for a later transmission.

10 Claims, 3 Drawing Sheets

CLUTTER NORMALIZATION BY ADAPTATION OF TRANSMIT WAVEFORM

FIELD OF THE INVENTION

This invention relates to radar, lidar, sonar, and other such ranging or location systems which attempt to detect or track targets in the presence of clutter.

BACKGROUND OF THE INVENTION

Radar systems have been in widespread use since the 1940s, and have continually increased in power and sophistication. In general, a radar arrangement transmits an electromagnetic signal toward a region in which a target may exist, and examines the returned electromagnetic "echo" to determine the presence of a target, its range, andor its bearing. It is well known in the art that the transmitted power must be increased in order to obtain a return signal of a given power from an increased distance. One of the problems which has been associated with radar (and its siblings sonar and lidar) is that of "clutter." Clutter is simply echoes or returns from objects within the area or region being examined which are irrelevant to the targets of interest. Typical sources of clutter include mountains, trees, buildings, ground vehicles, and other like objects. When targets at long range are to be detected or tracked, the transmitted power must be increased, with the result that clutter objects at greater distances will be revealed, and close-in clutter echo signals become stronger.

Clutter tends to obscure the presence of a target return as viewed on a display. More particularly, receivers are characterized by a finite "dynamic range" over which they operate optimally or linearly. In the presence of clutter, especially of clutter having variable amplitude, a weak target may fall below the dynamic range and become invisible. One early method for reducing the obscuring effects of clutter was "Moving Target Indication," (MTI) which involved processing of the returned signal or echo so as to tend to suppress those echoes or targets which had constant range and phase, thereby tending to render more visible those targets from objects having a changing range and phase.

Improved methods for clutter control are desired.

SUMMARY OF THE INVENTION

A method for improving the useful dynamic range of a radar, lidar, sonar, or equivalent apparatus according to a first aspect of the invention includes the step of generating a first transmit waveform which is controllable in at least one of amplitude and phase as a function of time, and transmitting the first transmit waveform toward a region. Returns are received from the region to thereby generate first received signals. Subsequent transmit waveforms are controlled by (a) comparing the first transmitted and first received signals by deconvolution to thereby generate a clutter kernel which is a representation of return clutter arising as a result of the first transmit waveform, (b) using the clutter kernel to predict the return which would be received from an alternate transmit waveform, and (c) comparing the variation in the clutter return between the first transmit waveform and the alternate transmit waveform to determine a succeeding waveform which should be used for a succeeding transmission. This aspect of the invention may further include the step of processing the return for determining at least one the range and direction of the target.

In a particular mode of this first aspect of the invention, the comparing step may include the step of selecting for the succeeding waveform that one of the first and alternate transmit waveforms which exhibits return clutter having the lower variation. The particular mode may further include the steps of (a) transmitting the succeeding waveform, (b) receiving a succeeding return resulting from transmission of the succeeding waveform, and (c) controlling a subsequent transmit waveform. The controlling of the subsequent transmit waveform may include the steps of (i) comparing the succeeding transmitted and succeeding received signals by deconvolution to thereby generate a clutter kernel which is a representation of return clutter arising as a result of the succeeding transmit waveform, (ii) using the clutter kernel to predict the return which would be received from a further alternate transmit waveform, and (iii) comparing the variation in the clutter return between the succeeding transmit waveform and the further alternate transmit waveform to determine a following waveform which should be used for a further succeeding transmission.

According to an other mode of a method according to an aspect of the invention, a method for improving the useful dynamic range of a radar or equivalent apparatus comprises the steps of generating a plurality of transmit waveforms which are controllable in at least one of amplitude and phase as a function of time, transmitting the plurality of transmit waveforms toward a region, and receiving returns from the region to thereby generate received signals. Subsequent transmit waveforms are controlled by the steps of (a) comparing the transmitted and received signals by deconvolution to thereby generate a clutter kernel which is a representation of return clutter arising as a result of the transmit waveforms, (b) integrating the clutter kernel with previously determined clutter kernels to thereby generate integrated clutter kernels, (c) obtaining alternative potential transmit waveforms, (d) using the integrated clutter kernels to predict the clutter return which would be received from at least some of the alternate potential transmit waveform, (e) determining the quality of the predicted clutter returns, and (f) comparing the quality of the predicted clutter returns with a standard to determine a succeeding transmit waveform which should be used for a succeeding transmission. In this other mode, the step of determining the quality of the predicted clutter returns may comprise determining the variability of the clutter returns as a function of time. The step of generating a plurality of transmit waveforms may include the step of accessing a memory preloaded with a plurality of different transmit waveforms. This other mode may also include the step of processing the return for determining at least one the range and direction of the target.

According to a yet further mode of this aspect of the invention, a method for generating a transmit waveform comprises the steps of generating a transmit waveform S(f) which is controllable in at least one of amplitude and phase as a function of time, transmitting the waveform toward a region which may contain a target, receiving a return R(f) from the target, processing the return for determining at least one of the range and direction of the target, and controlling the transmit waveform. The controlling of the transmit waveform includes the steps of (a) processing the transmitted and received signals by deconvolution to thereby generate a clutter kernel H(f) representation of clutter, (b) predicting the received clutter R'(f) which would be received from an alternate transmit waveform S'(f) by $$R'(f) = H(f) S'(f), \text{ and}$$

(c) comparing the variation in the received clutter between the transmit waveform and the alternate transmit waveform to determine which should be used for a succeeding transmission.

DESCRIPTION OF THE INVENTION

Figure 1:
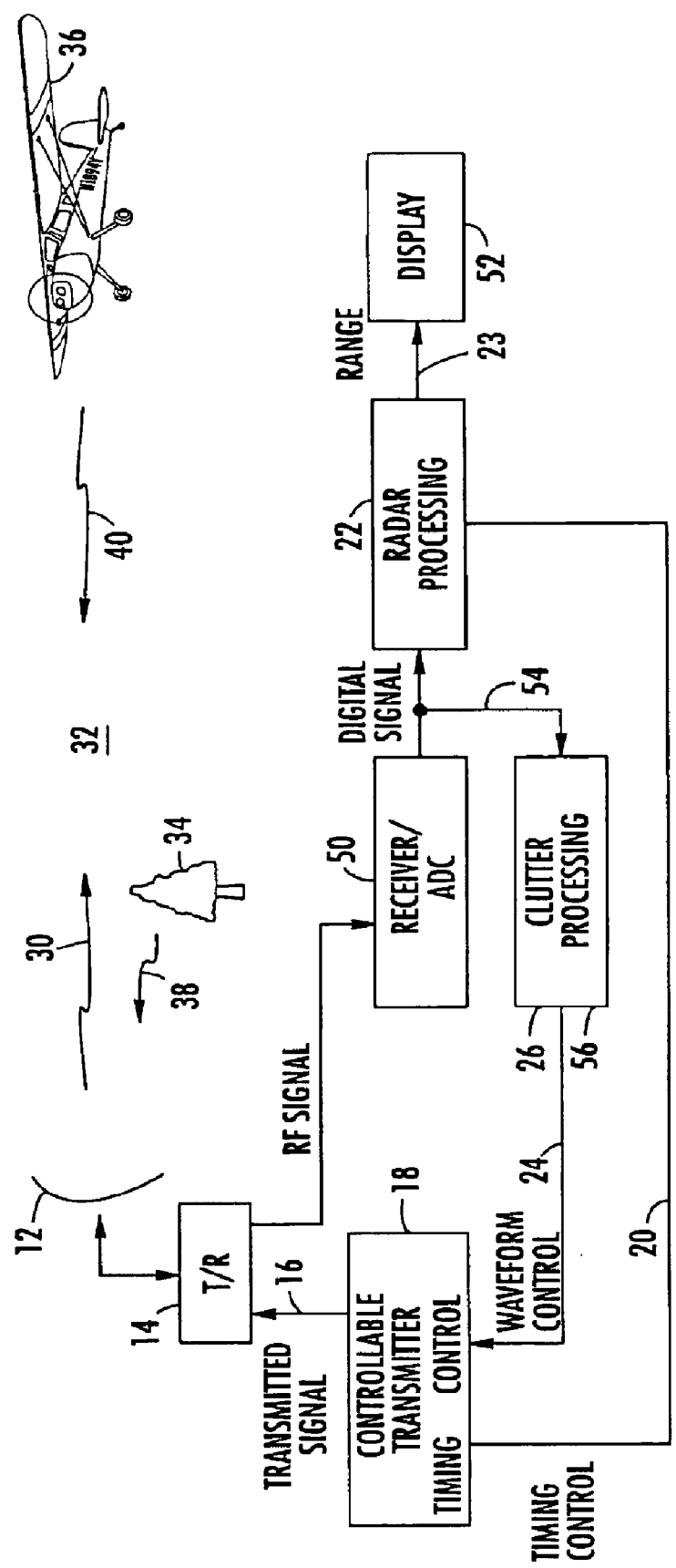
FIG. 1 is a simplified block diagram of a radar system according to an aspect of the invention.

FIG. 1 is a simplified block diagram of a radar system 10 according to an aspect of the invention. In FIG. 1, radar system 10 includes a transmit-receive antenna 12 which is connected to a conventional transmit/receive (T/R) apparatus 14. A signal to be transmitted is applied to T/R 14 by way of a path 16 from a controllable transmitter 18. Transmitter 18 is controllable in at least one of amplitude and phase as a function of time. That is to say, the amplitude of the transmitted waveform may be a time-dependent function, or the phase may be a time-dependent function, or both amplitude and phase may be time-dependent functions. The rate at which controllable transmitter 18 transmits its transmit waveform is controlled by timing signals flowing over a path illustrated as 20 to and from a radar processing function illustrated as a block 22. The amplitude andor phase as a function of time are controlled by waveform control signals flowing over a path 24 from a clutter processing block 26.

When radar processing block 22 of FIG. 1 commands that a radar transmit waveform be transmitted, controllable transmitter 18 produces a transmit waveform with the appropriate parameters, and sends it to antenna 12 by way of T/R device 14. Antenna 12 transmits the transmit waveform as electromagnetic radiation, illustrated by a "lightning bolt" symbol 30. The transmitted signal 30 propagates away from the antenna (to the right in FIG. 1) toward a region of space designated generally as 32. Region 32 contains, among other things, a clutter element illustrated as a tree 34 and a target in the form of an aircraft 36. Both clutter element 34 and target 36 reflect a portion of the electromagnetic radiation 30, as represented by reflected electromagnetic energy lightning bolts 38 and 40, respectively.

The reflected electromagnetic signals or returns 38 and 40 from the clutter element 34 and target 36 of FIG. 1 are received by antenna 12, and routed by way of T/R device 14 to a receiver/ADC illustrated as a block 50. Receiver 50 performs analog signal processing and ultimately converts the analog signals into digital signals by the use of an analog-to-digital converter (ADC). The digital signals representing the reflected electromagnetic signals 38 and 40 are applied from receiver/ADC 50 to conventional radar processing illustrated as a block 22. Processing block 22 processes the signals in known manner to produce signals at an output port 23 for application to a display 52. The signals produced by processing block 22 include information relating to at least the range of the target 36 from the antenna 12, and may also include target direction information such as bearing or elevation angle if antenna 12 supplies such information to block 22.

According to an aspect of the invention, radar 10 of FIG. 1 also includes a path 54 by which the digitized received signals may be applied to a "clutter" processing block 56. Clutter processing block 56 performs a deconvolution of the transmitted waveform 30 (or a copy thereof) with the return signal including returns 38 and 40, to generate a "clutter" kernel. In actuality, the total echo or return signal is processed, but the magnitude of the target signal(s) tend to be so small by comparison with the actual clutter component of the return that the total return may be viewed as being composed only of clutter for purposes of clutter determination. The clutter kernel is used in different ways in different embodiments of the invention. In a first embodiment, the clutter kernel determined by deconvolution is applied to another or alternate potential transmit waveform, different from the transmit waveform 30 in at least one of amplitude and phase as a function of time, to thereby predict the clutter which would be observed if that other or alternate transmit waveform were to be transmitted. The constancy or amplitude variations or variability of the clutter of the returned signal as indicated by the received signal at the output of receiver/ADC 50 is compared with that of the calculated clutter based on the alternate transmit waveform, to determine which waveform gives the more constant or least variable clutter return. That one of the waveforms which gives the more constant clutter is selected for a later transmission, and the controllable transmitter 18 is controlled to transmit that selected waveform.

The alternate waveform to which the kernels are applied may be predetermined, and stored in a memory, or they may be calculated on-line. In general, prestored alternate waveforms may not be optimal, in that it is unlikely that a sufficient number of such waveforms can be stored so as to always find the optimum. On-line calculation of the transmit waveform allows for the possibility of achieving an optimal transmit waveform, but requires additional processing.

While the invention as so far described calculates the clutter from only one waveform, and compares the variability of the clutter from that one waveform with the actual clutter, other schemes are possible. More particularly, for a given clutter kernel, the clutter may be calculated for a plurality of mutually different transmit waveforms, and the variability determination may be made by comparing each of the calculated clutters with the others to determine the most advantageous waveform from among the group, and then the clutter calculated for this most advantageous waveform may be compared with the actual clutter as measured for the actual transmitted waveform. In this fashion, many potential or candidate waveforms can be evaluated at once, and the best among them selected for later use.

Both the clutter calculations and the transmit waveform recurrence rate are dependent upon the particular conditions of each system. If the clutter kernel, alternate waveform clutter prediction, and variability comparison processing can be performed rapidly, it should be possible to reduce the dynamic range. More particularly, the peak amplitude of the clutter noise is reduced, to better utilize the finite dynamic range of the receiver on a transmit-pulse-to-transmit-pulse basis. If the processing is not sufficient for "on-line" control, the calculations can be performed "off-line," which is to say the calculations for the alternate waveform(s) are performed, and until the calculations are completed, each transmitted pulse is the same as the last. Once a suitable alternate transmit waveform has been identified, it can then be used as the transmit waveform while the next set of calculations is performed.

According to an aspect of the invention, the clutter kernel is generated by deconvolution according to the following expressions $$H(f) = \frac{R(f)}{S(f)} \quad (1)$$

where H(f), R(f), and S(f) are the Fourier transforms of clutter kernel h(t), receive waveform r(t), and transmit waveform s(t), respectively.

According to another aspect of the invention, the clutter is calculated for each potential alternate transmit waveform with the aid of the clutter kernel in accordance with $$R'(f) = H(f) \, S'(f) \quad (2)$$

where S'(f) represents the potential alternate transmit waveform and R'(f) represents the return from that alternate waveform.

Figure 2:
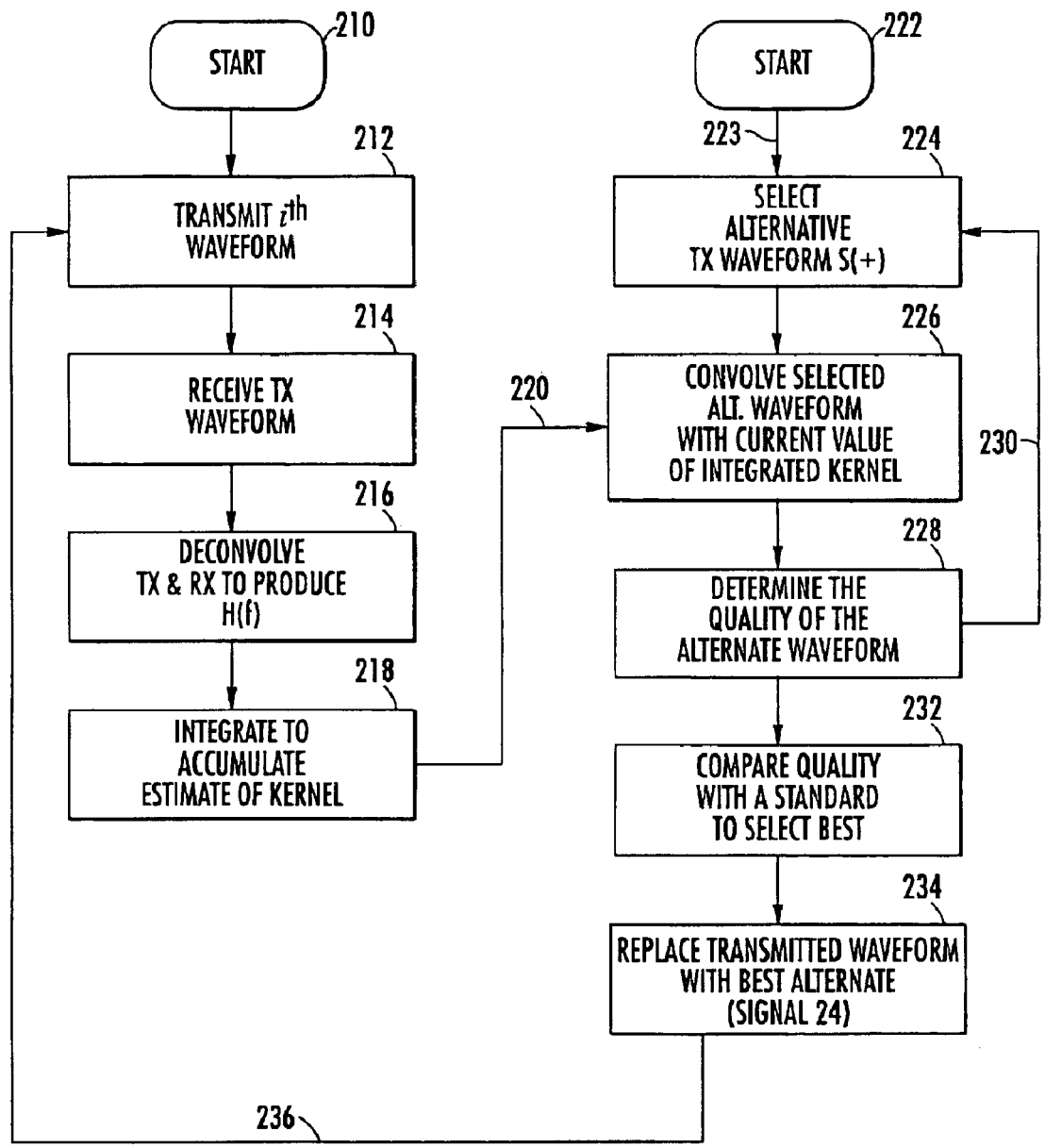
FIG. 2 is a simplified logic flow chart or diagram illustrating a method according to one aspect of the invention, including an selection of a best alternate transmit waveform.

FIG. 2 is a simplified flow chart or diagram illustrating the processing performed in clutter processing block 56 of FIG. 1. In FIG. 2, the logic starts at a START block 210, and proceeds to a block 212, which represents the transmission of a first transmit waveform during the first iteration of the logic. From block 212, the logic proceeds to a block 214, which represents the reception of echo signals including clutter, resulting from the first transmitted waveform. Block 216 represents the deconvolution of the transmit and receive waveforms according to equation (1) to produce H(f). From block 216, the logic flows to a block 218, which represents the integration or accumulation of an "average" estimate of the clutter kernel over a plurality of transmit cycles and logic iterations. The resulting average clutter kernel is then available for further processing by another logic process, illustrated in FIG. 2 as that of blocks 222, 224, 226, 232, and 234. In FIG. 2, this second logic process begins at a START block 222, and proceeds to a block 224, which represents the selection of an alternative waveform differing from the original transmitted waveform in at least one of amplitude and phase. Block 226 represents convolution of the selected alternative waveform with the current value of the average or integrated clutter kernel (from block 218). In effect, the result of block 226 is a measure of the total return (mostly clutter) which would result if the alternate waveform were to be transmitted and the integrated clutter kernel exactly described the environment. Block 228 represents a determination of the quality of the alternative waveform in respect to the peak value of the total return (mostly clutter). In its simplest form, block 228 may be a peak detector, in which the smallest peak value indicates the highest quality transmit waveform. In general, the quality of a transmit waveform is determined by the amount of variability in the received energy as a function of time. Larger variability corresponds to lesser quality. From block 228, the logic flows to a block 232, which compares the currently determined quality with historic values determined for other potential or alternative transmit waveforms, and the retention of the best one (the one with the lowest peak value of the clutter). The logic then loops back by way of a logic path 230 to block 224, to select another possible or alternate transmit waveform for evaluation against the average clutter kernel. From block 224, the logic again iterates around blocks 222, 224, 226, and 232. These iterations occur continuously, and block 232 always retains the current value of "best" waveform. Block 234 represents replacement of the current transmit waveform with the current value of the "best" alternate transmit waveform, and path 236 represents the path by which the replacement is accomplished.

Figure 3:
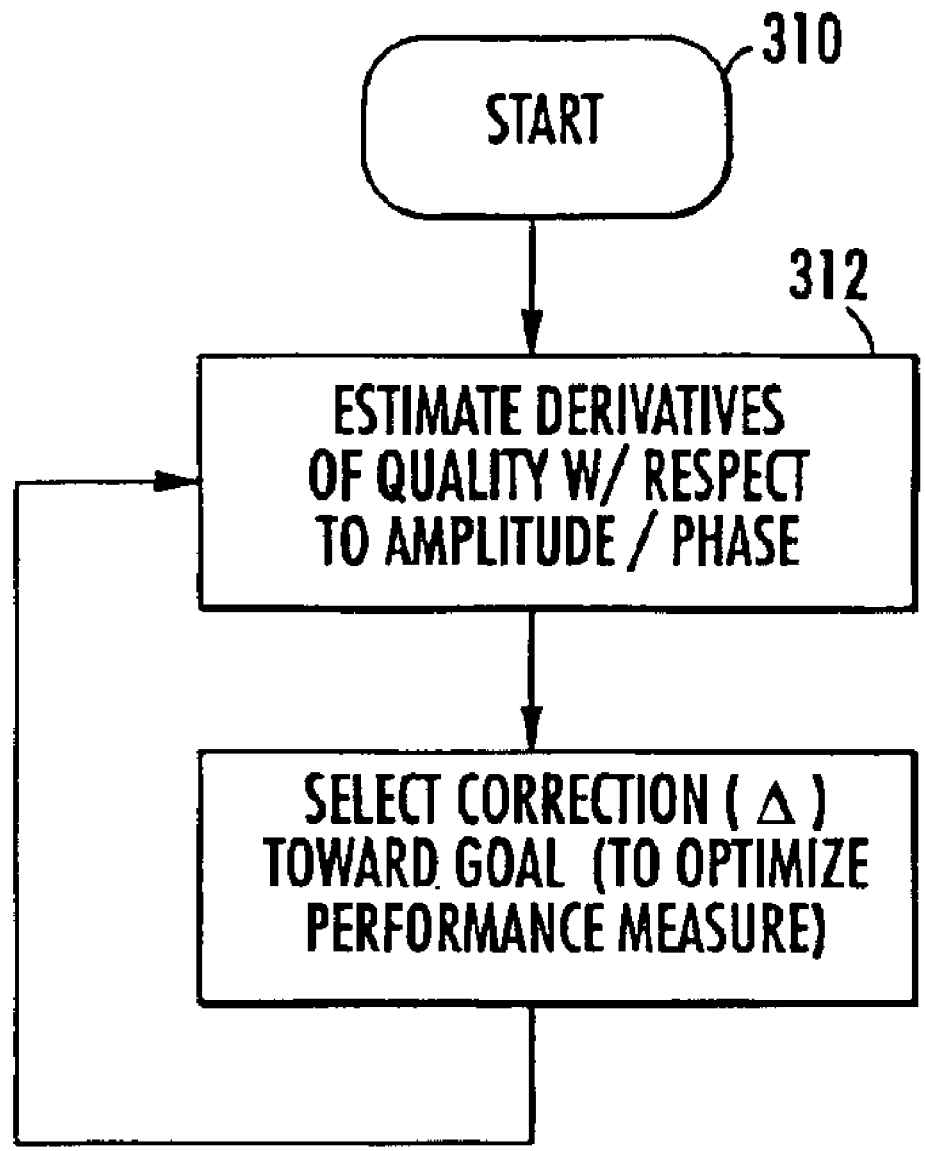
FIG. 3 is a simplified logic flow chart or diagram illustrating a method for performing the selection of the best alternate transmit waveform in FIG. 2.

Instead of storing a number of alternate transmit waveforms for evaluation in the selecting step of block 224 of FIG. 2, optimization of the phase, amplitude, or phase and amplitude characteristics of the alternate transmit waveform can be used. FIG. 3 is a simplified logic flow chart or diagram illustrating a form of optimization which can be used. In FIG. 3, the logic starts at a START block 310, and proceeds to a block 312. Block 312 represents the estimation of the derivatives of the quality with respect to amplitude, phase, or both amplitude and phase. First derivatives are enough, but estimation of second derivatives may provide a faster convergence. From block 312, the logic flows to a block 314, which represents section of a correction increment ( )) in the direction of the goal. The goal may be to minimize the variability or some estimate of the variability.

The quality of a transmit waveform is determined by the amount of variability in the received energy as a function of time. Larger variability corresponds with lower quality. The method of the invention attempts to find a waveform which minimizes (or has low) variability or some measure of variability. Measures of variability may include (a) the maximum of I(t) and Q(t) where I(t) and Q(t) are the in-phase and quadrature components of the return signal, (b) the variance of P(t), and (c) maximum of $|P(t) - P_{AVG}|$ where $P(t) = (I(t)^2 + Q(t)^2)$ is the return power as a function of time and $P_{avg}$ is the time average of P(t).

The invention tends not to suppress the display of targets, because targets generally lie in a single range cell. The clutter is distributed across many range cells. The normalized convolution reacts differently against a distributed kernel such as clutter by comparison with a localized kernel such as a target. That is, all normalized kernels produce the same power.

Other embodiments of the invention will be apparent to those skilled in the art. For example, the location in the radar processing at which the radar signals are converted from analog form to digital form may differ from one radar system to another. While the term "radar" is used in the description and claims, it should be understood to also apply to lidar and sonar. The clutter suppression according to the invention may be used all the time or selectively where most needed.

A method for improving the useful dynamic range of a radar, lidar, sonar, or equivalent apparatus (10) according to a first aspect of the invention includes the step of generating a first transmit waveform (18) which is controllable in at least one of amplitude and phase as a function of time, and transmitting (30) the first transmit waveform toward a region (32). Returns (40) are received from the region (32) to thereby generate first received signals (214). Subsequent transmit waveforms are controlled or selected by (a) comparing (216) the first transmitted and first received signals by deconvolution to thereby generate a clutter kernel which is a representation of return clutter arising as a result of the first transmit waveform, (b) using the clutter kernel so determined to predict the return (226) which would be received from at least one alternate transmit waveform (224), and (c) comparing the variation (228, 232) in the clutter return between the first transmit waveform and the alternate transmit waveform(s) to determine or select a succeeding waveform which should be used for a succeeding transmission (234). This aspect of the invention may further include the step of processing the return (22) for determining at least one the range and direction of the target.

In a particular mode of this first aspect of the invention, the comparing step (228, 232) may include the step of selecting (232) for the succeeding waveform that one of the first and alternate transmit waveforms which exhibits return clutter having the "best" quality. The best quality may be the return clutter having the lower variability, where measures of variability may include (a) the maximum of I(t) and Q(t) where I(t) and Q(t) are the in-phase and quadrature components of the return signal, (b) the variance of P(t), andor (c) maximum of $|P(t)-P_{AVG}|$ where $P(t)=(I(t)^2+Q(t)^2)$ is the return power as a function of time and $P_{avg}$ is the time average of P(t).] The particular mode may further include the steps of (a) transmitting the (or a) succeeding waveform (236, 212), (b) receiving a succeeding return (214) resulting from transmission of the (or a) succeeding waveform, and (c) controlling (218, 220, 224, 226, 228, 232, 234) a subsequent transmit waveform. The controlling of the subsequent transmit waveform may include the steps of (i) comparing (216) the succeeding transmitted and succeeding received signals by deconvolution to thereby generate a clutter kernel which is a representation of return clutter arising as a result of the succeeding transmit waveform, (ii) using the clutter kernel to predict the return (226) which would be received from a further alternate transmit waveform, and (iii) comparing the variation in the clutter return (228, 232) between the succeeding transmit waveform and the further alternate transmit waveform to determine (234) a following waveform which should be used for a further succeeding transmission.

According to an other mode of a method according to an aspect of the invention, a method for improving the useful dynamic range of a radar (10) comprises the steps of generating a plurality of transmit waveforms (30) which are controllable in at least one of amplitude and phase as a function of time, transmitting the plurality of transmit waveforms toward a region (32), and receiving returns (38, 40) from the region to thereby generate received signals. Subsequent transmit waveforms are controlled by the steps of (a) comparing the transmitted and received signals by deconvolution (216) to thereby generate a clutter kernel which is a representation of return clutter arising as a result of the transmit waveforms, (b) integrating the clutter kernel (218) with previously determined clutter kernels to thereby generate integrated clutter kernels, (c) obtaining alternative potential transmit waveforms (224), (d) using the integrated clutter kernels to predict the clutter return (226) which would be received from at least some of the alternate potential transmit waveform, (e) determining the quality (228) of the predicted clutter returns, and (f) comparing the quality (232) of the predicted clutter returns with a standard to determine a succeeding transmit waveform which should be used for a succeeding transmission. In this other mode, the step of determining the quality of the predicted clutter returns may comprise determining the variability of the clutter returns as a function of time. The step of generating a plurality of transmit waveforms may include the step of accessing a memory (224) preloaded with a plurality of different transmit waveforms. This other mode may also include the step of processing the return (22) for determining at least one the range and direction of the target.

According to a yet further mode of this aspect of the invention, a method for generating a transmit waveform comprises the steps of generating a transmit waveform S(f) which is controllable in at least one of amplitude and phase as a function of time, transmitting the waveform toward a region which may contain a target, receiving a return R(f) from the target, processing the return for determining at least one of the range and direction of the target, and controlling the transmit waveform. The controlling of the transmit waveform includes the steps of (a) processing the transmitted and received signals by deconvolution to thereby generate a clutter kernel H(f) representation of clutter, (b) predicting the received clutter R'(f) which would be received from an alternate transmit waveform S'(f) by R'(f)=H(f) S'(f), and (c) comparing the variation in the received clutter between the transmit waveform and the alternate transmit waveform to determine which should be used for a succeeding transmission.

What is claimed is:

1. A method for improving the useful dynamic range of a radar, said method comprising the steps of:
   generating a first transmit waveform which is controllable in at least one of amplitude and phase as a function of time;
   transmitting said first transmit waveform toward a region;
   receiving a return from said region to thereby generate first received signals; and
   controlling a subsequent transmit waveform by the steps of;
   (a) comparing said first transmitted and first received signals by deconvolution to thereby generate a clutter kernel which is a representation of return clutter arising as a result of said first transmit waveform;
   (b) using said clutter kernel to predict the return which would be received from an alternate transmit waveform; and
   (c) comparing the variation in the clutter return between said first transmit waveform and said alternate transmit waveform to determine a succeeding waveform which should be used for a succeeding transmission.

2. A method according to claim 1, wherein said step of controlling a subsequent transmit waveform is performed in a manner allowing each said generating step to be independently controlled.

3. A method according to claim 1, wherein said comparing step includes the step of selecting for said succeeding waveform that one of said first and alternate transmit waveforms which exhibits return clutter having the lower variation.

4. A method according to claim 3, further comprising the steps of:
   transmitting said succeeding waveform;
   receiving a succeeding return resulting from transmission of said succeeding waveform, and
   controlling a subsequent transmit waveform by the steps of;
   (a) comparing said succeeding transmitted and succeeding received signals by deconvolution to thereby generate a clutter kernel which is a representation of return clutter arising as a result of said succeeding transmit waveform;
   (b) using said clutter kernel to predict the return which would be received from a further alternate transmit waveform; and
   (c) comparing the variation in the clutter return between said succeeding transmit waveform and said further alternate transmit waveform to determine a following waveform which should be used for a further succeeding transmission.

5. A method according to claim 1, further comprising the step of processing said return for determining at least one the range and direction of said target.

6. A method for improving the useful dynamic range of a radar, said method comprising the steps of:
   generating a plurality of transmit waveforms which are controllable in at least one of amplitude and phase as a function of time;
   transmitting said plurality of transmit waveforms toward a region;

receiving returns from said region to thereby generate received signals; and controlling subsequent transmit waveforms by the steps of;
- (a) comparing said transmitted and received signals by deconvolution to thereby generate a clutter kernel which is a representation of return clutter arising as a result of said transmit waveforms;
- (b) integrating said clutter kernel with previously determined clutter kernels to thereby generate integrated clutter kernels;
- (c) obtaining alternative potential transmit waveforms;
- (d) using said integrated clutter kernels to predict the clutter return which would be received from at least some of said alternate potential transmit waveform;
- (e) determining the quality of the predicted clutter returns; and
- (f) comparing the quality of said predicted clutter returns with a standard to determine a succeeding transmit waveform which should be used for a succeeding transmission.

7. A method according to claim 6, wherein said step of determining the quality of the predicted clutter returns comprises determining the variability of said clutter returns as a function of time.

8. A method according to claim 6, wherein said step of generating a plurality of transmit waveforms includes the step of accessing a memory preloaded with a plurality of different transmit waveforms.

9. A method according to claim 6, further comprising the step of processing said return for determining at least one the range and direction of said target.

10. A method for generating a transmit waveform for one of radar, sonar, and lidar, said method comprising the steps of:

generating a transmit waveform S(f) which is controllable in at least one of amplitude and phase as a function of time;

transmitting said waveform toward a region which may contain a target;

receiving a return R(f) from said target;

processing said return for determining at least one of the range and direction of said target; and controlling said transmit waveform by the steps of
- (a) processing the transmitted and received signals by deconvolution to thereby generate a clutter kernel H(f) representation of clutter; and
- (b) predicting the received clutter R'(f) which would be received from an alternate transmit waveform S'(f) by $$R'(f) = H(f)\, S'(f); \text{ and}$$

- (c) comparing the variation in the received clutter between said transmit waveform and said alternate transmit waveform to determine which should be used for a succeeding transmission.

* * * * *